US010902215B1

(12) United States Patent
Zhang et al.

(10) Patent No.: US 10,902,215 B1
(45) Date of Patent: *Jan. 26, 2021

(54) SOCIAL HASH FOR LANGUAGE MODELS

(71) Applicant: Facebook, Inc., Menlo Park, CA (US)

(72) Inventors: Ying Zhang, Turlock, CA (US); Christian Fuegen, Sunnyvale, CA (US); Guillaume Lample, Pittsburg, PA (US); Jing Zheng, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 800 days.

This patent is subject to a terminal disclaimer.

(21) Appl. No.: 15/244,179

(22) Filed: Aug. 23, 2016

Related U.S. Application Data

(63) Continuation-in-part of application No. 15/199,890, filed on Jun. 30, 2016.

(51) Int. Cl.
| | |
|---|---|
| *G06F 40/45* | (2020.01) |
| *G06N 3/08* | (2006.01) |
| *G06N 3/04* | (2006.01) |
| *G06F 16/35* | (2019.01) |
| *G06F 40/35* | (2020.01) |

(52) U.S. Cl.
CPC ............. *G06F 40/45* (2020.01); *G06F 16/35* (2019.01); *G06F 40/35* (2020.01); *G06N 3/04* (2013.01); *G06N 3/08* (2013.01)

(58) Field of Classification Search
CPC .... G06F 17/289; G06F 17/2827; G06F 16/35; G06F 17/279; G06F 40/45; G06F 40/35; G06N 3/04; G06N 3/08
See application file for complete search history.

(56) References Cited

U.S. PATENT DOCUMENTS

| | | |
|---|---|---|
| 5,293,581 A | 3/1994 | DiMarco et al. |
| 5,477,451 A | 12/1995 | Brown et al. |

(Continued)

OTHER PUBLICATIONS

Deselaers et al., "A Deep Learning Approach to Machine Transliteration", Mar. 30-31, 2009, Proceedings of the Fourth Workshop on Statistical Machine Translation, pp. 233-241 (Year: 2009).*

(Continued)

*Primary Examiner* — Kamran Afshar
*Assistant Examiner* — Brent Johnston Hoover
(74) *Attorney, Agent, or Firm* — Kacvinsky Daisak Bluni PLLC

(57) ABSTRACT

Components of language processing engines, such as translation models and language models, can be customized for groups of users or based on user type values. Users can be organized into groups or assigned a value on a continuum based on factors such as interests, biographical characteristics, social media interactions, etc. In some implementations, translation engine components can be customized for groups of users by selecting the training data from content created by users in that group. In some implementations, the group identifier or continuum value can be part of the input into a general translation component allowing the translation component to take a language style of that user group into account when performing language processing tasks.

20 Claims, 10 Drawing Sheets

(56) References Cited

U.S. PATENT DOCUMENTS

| | | | |
|---|---|---|---|
| 5,510,981 A | 4/1996 | Berger et al. | |
| 5,799,193 A | 8/1998 | Sherman et al. | |
| 5,991,710 A | 11/1999 | Papineni et al. | |
| 6,002,998 A | 12/1999 | Martino et al. | |
| 6,157,905 A | 12/2000 | Powell | |
| 6,161,082 A | 12/2000 | Goldberg | |
| 6,223,150 B1 | 4/2001 | Duan et al. | |
| 6,266,642 B1 | 7/2001 | Franz et al. | |
| 6,304,841 B1 | 10/2001 | Berger et al. | |
| 6,377,925 B1 | 4/2002 | Newman et al. | |
| 6,393,389 B1 | 5/2002 | Chanod et al. | |
| 6,629,095 B1 | 9/2003 | Wagstaff et al. | |
| 7,054,804 B2 | 5/2006 | Gonzales et al. | |
| 7,110,938 B1 | 9/2006 | Cheng et al. | |
| 7,359,861 B2 | 4/2008 | Lee et al. | |
| 7,533,019 B1 | 5/2009 | Riccardi et al. | |
| 7,664,629 B2 | 2/2010 | Dymetman et al. | |
| 7,813,918 B2 | 10/2010 | Muslea et al. | |
| 7,827,026 B2 | 11/2010 | Brun et al. | |
| 7,895,030 B2 | 2/2011 | Al-Onaizan et al. | |
| 7,983,903 B2 | 7/2011 | Gao et al. | |
| 8,015,140 B2 | 9/2011 | Kumar et al. | |
| 8,145,484 B2 | 3/2012 | Zweig et al. | |
| 8,175,244 B1 | 5/2012 | Frankel et al. | |
| 8,204,739 B2 | 6/2012 | Lane et al. | |
| 8,209,333 B2 | 6/2012 | Hubbard et al. | |
| 8,265,923 B2 | 9/2012 | Chatterjee et al. | |
| 8,275,602 B2 | 9/2012 | Curry et al. | |
| 8,386,235 B2 | 2/2013 | Duan et al. | |
| 8,543,580 B2 | 9/2013 | Chen et al. | |
| 8,756,050 B1 | 6/2014 | Curtis et al. | |
| 8,825,466 B1 | 9/2014 | Wang et al. | |
| 8,825,759 B1 | 9/2014 | Ho et al. | |
| 8,831,928 B2 | 9/2014 | Marcu et al. | |
| 8,838,434 B1 | 9/2014 | Liu | |
| 8,874,429 B1 | 10/2014 | Crosley et al. | |
| 8,897,423 B2 | 11/2014 | Nanjundaswamy | |
| 8,935,150 B2 | 1/2015 | Christ | |
| 8,942,973 B2 | 1/2015 | Viswanathan | |
| 8,949,865 B1 | 2/2015 | Murugesan et al. | |
| 8,983,974 B1 | 3/2015 | Ho et al. | |
| 8,990,068 B2 | 3/2015 | Orsini et al. | |
| 8,996,352 B2 | 3/2015 | Orsini et al. | |
| 8,996,353 B2 | 3/2015 | Orsini et al. | |
| 8,996,355 B2 | 3/2015 | Orsini et al. | |
| 9,009,025 B1 | 4/2015 | Porter et al. | |
| 9,031,829 B2 | 5/2015 | Leydon et al. | |
| 9,104,661 B1 | 8/2015 | Evans | |
| 9,183,309 B2 | 11/2015 | Gupta | |
| 9,231,898 B2 | 1/2016 | Orsini et al. | |
| 9,245,278 B2 | 1/2016 | Orsini et al. | |
| 9,336,206 B1 | 5/2016 | Orsini et al. | |
| 9,477,652 B2 | 10/2016 | Huang et al. | |
| 9,734,142 B2 | 8/2017 | Huang et al. | |
| 9,734,143 B2 | 8/2017 | Rottmann et al. | |
| 9,740,687 B2 | 8/2017 | Herdagdelen et al. | |
| 9,747,283 B2 | 8/2017 | Rottmann et al. | |
| 9,805,029 B2 | 10/2017 | Rottmann et al. | |
| 9,830,386 B2 | 11/2017 | Huang et al. | |
| 9,830,404 B2 | 11/2017 | Huang et al. | |
| 2002/0087301 A1 | 7/2002 | Jones et al. | |
| 2002/0161579 A1 | 10/2002 | Saindon et al. | |
| 2002/0169592 A1 | 11/2002 | Aityan | |
| 2003/0040900 A1 | 2/2003 | D'Agostini et al. | |
| 2004/0002848 A1 | 1/2004 | Zhou et al. | |
| 2004/0049374 A1 | 3/2004 | Breslau et al. | |
| 2004/0098247 A1 | 5/2004 | Moore | |
| 2004/0122656 A1 | 6/2004 | Abir et al. | |
| 2004/0243392 A1 | 12/2004 | Chino et al. | |
| 2005/0021323 A1 | 1/2005 | Li et al. | |
| 2005/0055630 A1 | 3/2005 | Scanlan et al. | |
| 2005/0228640 A1 | 10/2005 | Aue et al. | |
| 2006/0111891 A1 | 5/2006 | Menezes et al. | |
| 2006/0206798 A1 | 9/2006 | Kohlmeier et al. | |
| 2006/0271352 A1 | 11/2006 | Nikitin et al. | |
| 2007/0130563 A1 | 6/2007 | Elgazzar et al. | |
| 2007/0136222 A1 | 6/2007 | Horvitz et al. | |
| 2008/0046231 A1 | 2/2008 | Laden et al. | |
| 2008/0077384 A1 | 3/2008 | Agapi et al. | |
| 2008/0221866 A1* | 9/2008 | Katragadda ............ G06F 40/53 704/8 |
| 2008/0281578 A1 | 11/2008 | Kumaran et al. | |
| 2009/0070095 A1 | 3/2009 | Gao et al. | |
| 2009/0083023 A1 | 3/2009 | Foster et al. | |
| 2009/0132233 A1 | 5/2009 | Etzioni et al. | |
| 2009/0182547 A1 | 7/2009 | Niu et al. | |
| 2009/0198487 A1 | 8/2009 | Wong et al. | |
| 2009/0210214 A1 | 8/2009 | Qian et al. | |
| 2009/0276206 A1 | 11/2009 | Fitzpatrick et al. | |
| 2009/0281789 A1 | 11/2009 | Waibel et al. | |
| 2009/0326912 A1 | 12/2009 | Ueffing et al. | |
| 2010/0042928 A1 | 2/2010 | Rinearson et al. | |
| 2010/0121639 A1 | 5/2010 | Zweig et al. | |
| 2010/0149803 A1 | 6/2010 | Nakano et al. | |
| 2010/0161642 A1 | 6/2010 | Chen et al. | |
| 2010/0194979 A1 | 8/2010 | Blumenschein et al. | |
| 2010/0223048 A1 | 9/2010 | Lauder et al. | |
| 2010/0228777 A1 | 9/2010 | Imig et al. | |
| 2010/0241416 A1 | 9/2010 | Jiang et al. | |
| 2010/0283829 A1 | 11/2010 | De Beer et al. | |
| 2010/0299132 A1 | 11/2010 | Dolan et al. | |
| 2011/0099000 A1 | 4/2011 | Rai et al. | |
| 2011/0137636 A1 | 6/2011 | Srihari et al. | |
| 2011/0246172 A1 | 10/2011 | Liberman et al. | |
| 2011/0246881 A1 | 10/2011 | Kushman et al. | |
| 2011/0252027 A1 | 10/2011 | Chen et al. | |
| 2011/0282648 A1 | 11/2011 | Sarikaya et al. | |
| 2012/0005224 A1 | 1/2012 | Ahrens et al. | |
| 2012/0029910 A1 | 2/2012 | Medlock et al. | |
| 2012/0035907 A1 | 2/2012 | Lebeau et al. | |
| 2012/0035915 A1 | 2/2012 | Kitade et al. | |
| 2012/0047172 A1 | 2/2012 | Ponte et al. | |
| 2012/0059653 A1 | 3/2012 | Adams et al. | |
| 2012/0101804 A1 | 4/2012 | Roth et al. | |
| 2012/0109649 A1 | 5/2012 | Talwar et al. | |
| 2012/0123765 A1 | 5/2012 | Estelle et al. | |
| 2012/0130940 A1 | 5/2012 | Gattani et al. | |
| 2012/0138211 A1 | 6/2012 | Barger et al. | |
| 2012/0158621 A1 | 6/2012 | Bennett et al. | |
| 2012/0173224 A1 | 7/2012 | Anisimovich et al. | |
| 2012/0209588 A1 | 8/2012 | Wu et al. | |
| 2012/0253785 A1 | 10/2012 | Hamid et al. | |
| 2012/0330643 A1 | 12/2012 | Frei et al. | |
| 2013/0018650 A1 | 1/2013 | Moore et al. | |
| 2013/0060769 A1 | 3/2013 | Pereg et al. | |
| 2013/0084976 A1 | 4/2013 | Kumaran et al. | |
| 2013/0103384 A1 | 4/2013 | Hunter et al. | |
| 2013/0144595 A1 | 6/2013 | Lord et al. | |
| 2013/0144603 A1 | 6/2013 | Lord et al. | |
| 2013/0144619 A1 | 6/2013 | Lord et al. | |
| 2013/0173247 A1 | 7/2013 | Hodson et al. | |
| 2013/0246063 A1 | 9/2013 | Teller et al. | |
| 2013/0317808 A1 | 11/2013 | Kruel et al. | |
| 2014/0006003 A1 | 1/2014 | Soricut et al. | |
| 2014/0006929 A1 | 1/2014 | Swartz et al. | |
| 2014/0012568 A1 | 1/2014 | Caskey et al. | |
| 2014/0025734 A1 | 1/2014 | Griffin et al. | |
| 2014/0059030 A1 | 2/2014 | Hakkani-Tur et al. | |
| 2014/0081619 A1 | 3/2014 | Solntseva et al. | |
| 2014/0108393 A1 | 4/2014 | Angwin et al. | |
| 2014/0163977 A1 | 6/2014 | Hoffmeister et al. | |
| 2014/0172413 A1 | 6/2014 | Cvijetic et al. | |
| 2014/0195884 A1 | 7/2014 | Castelli et al. | |
| 2014/0207439 A1 | 7/2014 | Venkatapathy et al. | |
| 2014/0229155 A1 | 8/2014 | Leydon et al. | |
| 2014/0279996 A1 | 9/2014 | Teevan et al. | |
| 2014/0280295 A1 | 9/2014 | Kurochkin et al. | |
| 2014/0280592 A1 | 9/2014 | Zafarani et al. | |
| 2014/0288913 A1 | 9/2014 | Shen et al. | |
| 2014/0288917 A1 | 9/2014 | Orsini et al. | |
| 2014/0288918 A1 | 9/2014 | Orsini et al. | |
| 2014/0303960 A1 | 10/2014 | Orsini et al. | |
| 2014/0335483 A1 | 11/2014 | Buryak et al. | |
| 2014/0337007 A1 | 11/2014 | Fuegen et al. | |

(56) References Cited

U.S. PATENT DOCUMENTS

| | | |
|---|---|---|
| 2014/0337989 A1 | 11/2014 | Bojja et al. |
| 2014/0350916 A1 | 11/2014 | Jagpal et al. |
| 2014/0358519 A1 | 12/2014 | Dymetman et al. |
| 2014/0365200 A1 | 12/2014 | Sagie |
| 2014/0365460 A1 | 12/2014 | Portnoy et al. |
| 2015/0006143 A1 | 1/2015 | Skiba et al. |
| 2015/0006219 A1 | 1/2015 | Jose et al. |
| 2015/0033116 A1 | 1/2015 | Severdia et al. |
| 2015/0046146 A1 | 2/2015 | Crosley et al. |
| 2015/0066805 A1 | 3/2015 | Taira et al. |
| 2015/0120290 A1 | 4/2015 | Shagalov |
| 2015/0134322 A1 | 5/2015 | Cuthbert et al. |
| 2015/0142420 A1 | 5/2015 | Sarikaya et al. |
| 2015/0161104 A1 | 6/2015 | Buryak et al. |
| 2015/0161110 A1 | 6/2015 | Salz |
| 2015/0161112 A1 | 6/2015 | Galvez et al. |
| 2015/0161114 A1 | 6/2015 | Buryak et al. |
| 2015/0161115 A1 | 6/2015 | Denero et al. |
| 2015/0161227 A1 | 6/2015 | Buryak et al. |
| 2015/0213008 A1 | 7/2015 | Orsini et al. |
| 2015/0228279 A1 | 8/2015 | Moreno et al. |
| 2015/0293997 A1 | 10/2015 | Smith et al. |
| 2015/0363388 A1 | 12/2015 | Herdagdelen et al. |
| 2016/0041986 A1 | 2/2016 | Nguyen |
| 2016/0048505 A1 | 2/2016 | Tian et al. |
| 2016/0092603 A1 | 3/2016 | Rezaei et al. |
| 2016/0117628 A1 | 4/2016 | Brophy et al. |
| 2016/0162473 A1 | 6/2016 | Hedley et al. |
| 2016/0162477 A1 | 6/2016 | Orsini et al. |
| 2016/0162478 A1 | 6/2016 | Blassin et al. |
| 2016/0162575 A1 | 6/2016 | Eck et al. |
| 2016/0177628 A1 | 6/2016 | Juvani |
| 2016/0188575 A1 | 6/2016 | Sawaf |
| 2016/0188576 A1 | 6/2016 | Huang et al. |
| 2016/0188661 A1 | 6/2016 | Zhang et al. |
| 2016/0188703 A1 | 6/2016 | Zhang et al. |
| 2016/0217124 A1 | 7/2016 | Sarikaya et al. |
| 2016/0239476 A1 | 8/2016 | Huang |
| 2016/0267073 A1 | 9/2016 | Noeman et al. |
| 2016/0299884 A1 | 10/2016 | Chioasca et al. |
| 2016/0357519 A1 | 12/2016 | Vargas et al. |
| 2017/0011739 A1 | 1/2017 | Huang et al. |
| 2017/0083504 A1 | 3/2017 | Huang |
| 2017/0169015 A1 | 6/2017 | Huang |
| 2017/0177564 A1 | 6/2017 | Rottmann et al. |
| 2017/0185583 A1 | 6/2017 | Pino et al. |
| 2017/0185586 A1 | 6/2017 | Rottmann |
| 2017/0185588 A1 | 6/2017 | Rottmann et al. |
| 2017/0256254 A1* | 9/2017 | Huang .................... G10L 15/02 |
| 2017/0270102 A1 | 9/2017 | Herdagdelen et al. |
| 2017/0315988 A1 | 11/2017 | Herdagdelen et al. |
| 2017/0315991 A1 | 11/2017 | Rottmann et al. |

OTHER PUBLICATIONS

Verga et al., "Efficient Unsupervised Authorship Clustering Using Impostor Similarity", 2014, pp. 1-13 (Year: 2014).*
Hoang et al., "Incorporating Side Information into Recurrent Neural Network Language Models", Jun. 12-17, 2016, pp. 1250-1255 (Year: 2016).*
Chen et al., "Clustering Sparse Graphs", 2012, Advances in Neural Information Processing Systems 25, pp. 1-9 (Year: 2012).*
Scheible et al., "Uncovering Distributional Differences between Synonyms and Antonyms in a Word Space Model", Oct. 14-18, 2013, International Joint Conference on Natural Language Processing, pp. 489-494 (Year: 2013).*
Non-Final Office Action dated Feb. 9, 2017, for U.S. Appl. No. 14/559,540 of Eck, M. et al., filed Dec. 3, 2014.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Dec. 29, 2016, for U.S. Appl. No. 14/586,049 of Huang, F. et al., filed Dec. 30, 2014.
Non-Final Office Action dated Dec. 30, 2016 in U.S. Appl. No. 14/586,074 by Huang, F. et al., filed Dec. 30, 2014.
Non-Final Office Action dated Jul. 28, 2016, for U.S. Appl. No. 14/861,747 of F. Huang, filed Sep. 22, 2015.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K. filed Dec. 28, 2015.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017 for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Mar. 1, 2017, for U.S. Appl. No. 14/981,769 by Rottmann, K., et al., filed Dec. 28, 2015.
Sutskever, I., et al., "Sequence to sequence learning with neural networks," Advances in Neural Information Processing Systems, pp. 3104-3112, 2014.
U.S. Appl. No. 14/586,049, by Huang et al., filed Dec. 30, 2014.
U.S. Appl. No. 14/586,074 by Huang et al., filed Dec. 30, 2014.
U.S. Appl. No. 14/861,747 by Huang, F., filed Sep. 22, 2015.
U.S. Appl. No. 14/973,387, of Rottmann, K., et al., filed Dec. 17, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/445,978 by Herdagdelen, A., et al., filed Feb. 28, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Final Office Action dated Jul. 1, 2016, for U.S. Appl. No. 14/302,032 of Herdagdelen, A., filed Jun. 11, 2014.
Non-Final Office Action dated Dec. 17, 2015, for U.S. Appl. No. 14/302,032 of Saint Cyr, L., filed Jun. 11, 2014.
Non-Final Office Action dated Mar. 10, 2016, for U.S. Appl. No. 14/621,921 of Huang, F., filed Feb. 13, 2015.
Notice of Allowance dated Jul. 18, 2016, for U.S. Appl. No. 14/621,921 of Huang, F., filed Feb. 13, 2015.
U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/586,022 of Huang, F. et al., filed Dec. 30, 2014.
U.S. Appl. No. 14/621,921 of Huang, F., filed Feb. 13, 2015.
U.S. Appl. No. 14/967,897 of Huang F. et al., filed Dec. 14, 2015.
U.S. Appl. No. 14/980,654 of Pino, J. et al., filed Dec. 28, 2015.
U.S. Appl. No. 15/199,890 of Zhang, Y. et al., filed Jun. 30, 2016.
Final Office Action dated Aug. 10, 2017 for U.S. Appl. No. 15/275,235 by Huang, F. et al. filed Sep. 23, 2016.
Final Office Action dated Aug. 25, 2017 for U.S. Appl. No. 14/980,654 by Pino, J. et al., filed Dec. 28, 2015.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Notice of Allowance dated Aug. 30, 2017 for U.S. Appl. No. 14/559,540 by Eck, M. et al. filed Dec. 3, 2014.
Notice of Allowance dated Aug. 4, 2017, for U.S. Appl. No. 14/981,794 by Rottman, K., et al., filed Dec. 28, 2015.
Notice of Allowance dated Jul. 26, 2017, for U.S. Appl. No. 14/586,074 by Huang, F., et al., filed Dec. 30, 2014.
Notice of Allowance dated Jul. 28, 2017, for U.S. Appl. No. 14/586,049 by Huang, F., et al., filed Dec. 30, 2014.
U.S. Appl. No. 15/652,144 of Rottmann, K., filed Jul. 17, 2017.

(56) References Cited

OTHER PUBLICATIONS

U.S. Appl. No. 15/654,668 of Rottmann, K., filed Jul. 19, 2017.
U.S. Appl. No. 15/672,690 of Huang, F., filed Aug. 9, 2017.
U.S. Appl. No. 15/696,121 of Rottmann, K. et al., filed Sep. 5, 2017.
Corrected Notice of Allowability dated Nov. 17, 2017, for U.S. Appl. No. 14/559,540 of Eck, M. et al., filed Dec. 3, 2014.
Notice of Allowance dated Dec. 8, 2017 for U.S. Appl. No. 15/652,175 by Herdagdelen, A., filed Jul. 17, 2017.
Corrected Notice of Allowability dated Dec. 12, 2017, for U.S. Appl. No. 14/559,540 of Eck, M. et al., filed Dec. 3, 2014.
U.S. Appl. No. 15/820,351 by Huang et al., filed Nov. 21, 2017.
U.S. Appl. No. 15/821,167 by Huang et al., filed Nov. 22, 2017.
Zamora, J.D., et al., "Tweets language identification using feature weightings," Proceedings of the Twitter language identification workshop, Sep. 16, 2014, 5 pages.
Extended European Search Report for European Application No. 16161095.1, dated Feb. 16, 2017, 4 pages.
U.S. Appl. No. 15/644,690 of Huang, F. et al., filed Jul. 7, 2017.
Notice of Allowance dated Jul. 12, 2017, for U.S. Appl. No. 14/981,794 by Rottman, K., et al., filed Dec. 28, 2015.
Supplemental Notice of Allowability dated Jul. 13, 2017, for U.S. Appl. No. 14/981,769 by Rottmann, K., et al., filed Dec. 28, 2015.
Corrected Notice of Allowability dated Jul. 13, 2017, for U.S. Appl. No. 14/973,387 of Rottmann, K., et al., filed Dec. 17, 2015.
Non-Final Office Action dated Dec. 21, 2016, for U.S. Appl. No. 14/586,022 of Huang, F., filed Dec. 30, 2014.
Non-Final Office Action dated Jan. 12, 2017, for U.S. Appl. No. 15/275,235 of Huang, F. et al., filed Sep. 23, 2016.
Notice of Allowance dated Nov. 30, 2016, for U.S. Appl. No. 14/302,032 of Herdagdelen, A., filed Jun. 11, 2014.
U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Final Office Action dated Jun. 16, 2017, for U.S. Appl. No. 14/586,022 of Huang, F. et al., filed Dec. 30, 2014.
Notice of Allowance dated Jun. 6, 2017, for U.S. Appl. No. 14/981,794 by Rottman, K., et al., filed Dec. 28, 2015.
Non-Final Office Action dated Jun. 26, 2017, for U.S. Appl. No. 15/445,978 of Herdagdelen, A., filed Feb. 28, 2017.
Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottmann, K., et al., filed Dec. 28, 2015.
Notice of Allowability dated Sep. 19, 2017 for U.S. Appl. No. 14/559,540 by Eck, M. et al. filed Dec. 3, 2014.
Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A. filed Feb. 28, 2017.
Taylor, S. et al. "Forecasting at Scale" Jan. 2017, retrieved from https://facebookincubator.github.io/prophet/static/prophet_paper_20170113.pdf.
U.S. Appl. No. 15/723,095 of Tiwari, P. filed Oct. 2, 2017.

* cited by examiner

SOCIAL HASH FOR LANGUAGE MODELS

CROSS-REFERENCE TO RELATED APPLICATIONS

This application is a continuation-in-part of U.S. patent application Ser. No. 15/199,890, filed Jun. 30, 2016, the disclosure of which is hereby incorporated by reference in its entirety.

BACKGROUND

The Internet has made it possible for people to connect and share information in ways previously undreamt of. Social media platforms, for example, enable people on opposite sides of the world to collaborate on ideas, discuss current events, or share what they had for lunch. In the past, this spectacular resource has been somewhat limited to communications between users having a common natural language ("language"). In addition, users have only been able to consume content that is in their language, or for which a content provider is able to determine an appropriate translation.

While communication across the many different languages used around the world is a particular challenge, several machine translation engines have attempted to address this concern. Machine translation engines enable a user to select or provide a content item (e.g., a message from an acquaintance) and quickly receive a translation of the content item. In some cases machine translation engines can include one or more "translation models" and one or more "language models." Creating a translation model can use training data that includes identical or similar content in both a source and an output language to generate mappings of words or phrases in a source language to words or phrases in an output language. Creating a language model can use training data that includes a corpus of data in the output language to generate probability distributions of words or phrases that are likely to go together in the output language.

Machine translation engine training data is often obtained from news reports, parliament domains, educational "wiki" sources, etc. In many cases, the source of training data that is used to create a machine translation engine is from a considerably different domain than the content on which that machine translation engine is used for translations. For example, content in the social media domain is often short and can include slang terms, colloquial expressions, spelling errors, incorrect diacritical marks, and other features not common in carefully edited news sources, parliament documents, or educational wiki sources.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
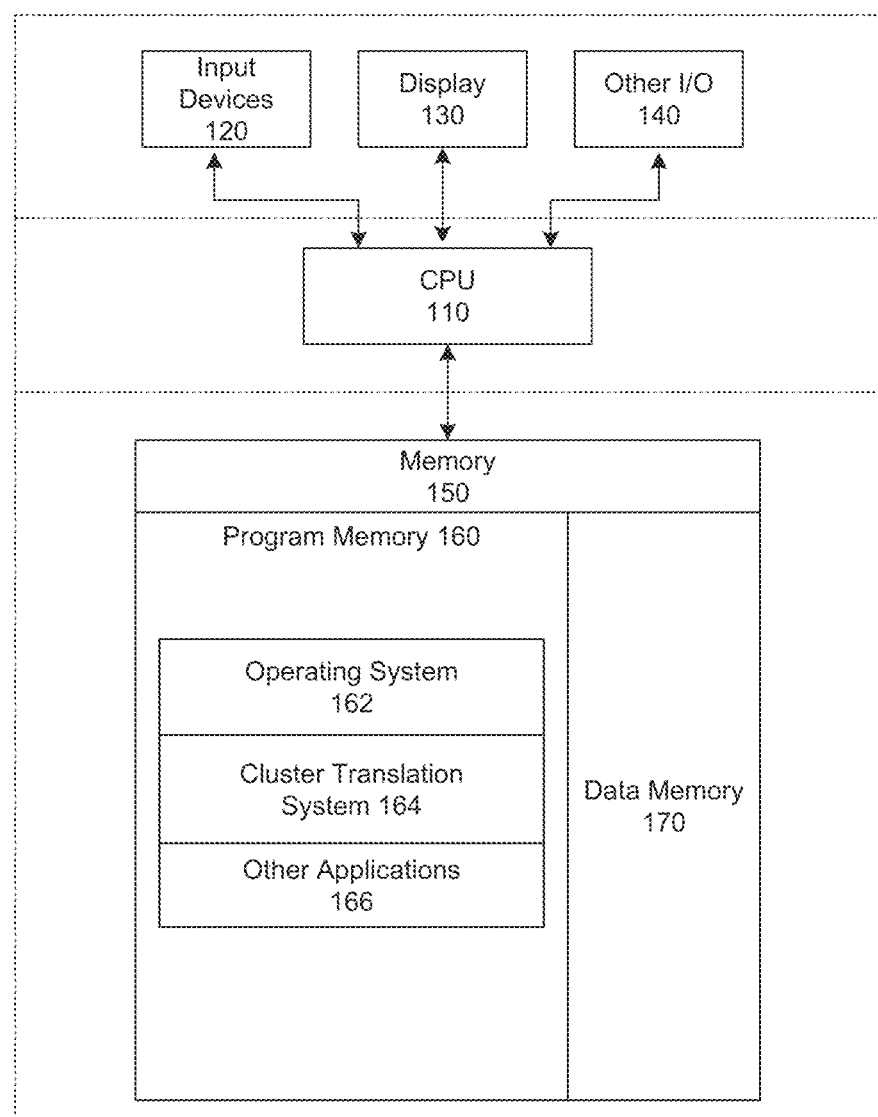
FIG. 1 is a block diagram illustrating an overview of devices on which some implementations can operate.

Embodiments are disclosed for building and applying translation engines that perform improved translations based on user clustering. A translation system can accomplish improved translations by applying a "cluster translation engine" which has at least one component customized to generate output for a particular user cluster. For example, in various implementations, a translation system can include a model, such as a neural network, that helps define mappings between words or phrases in different languages or a distribution defining how likely words or phrases are to appear in a given language, given a user cluster for the author of the content item. A "content item," as used herein, refers to a digital visual or audio data that includes a representation of one or more words or groups of characters from a natural language. In some implementations, content items can be obtained from social network items, such as posts, news items, events, shares, comments, etc.

A "user cluster," as used herein, is a type identified for a group of users sharing a set of characteristics or a signal, falling on a continuum, based on a combination of user characteristics. In various implementations, user characteristics can include gender, age, date of birth, country, region, city, level of education, life stage, etc. In some implementations, a user group can be defined for users that share a value for a specified set of user characteristics. In some implementations, values for a set of these characteristics can be combined into an "embedding." For example, the characteristic values for a user can be entered in a sparse matrix, which can be mapped into a lower dimensional embedded value representing a combination of the characteristics.

In some implementations, a cluster translation engine can be built using training data to train a model portion of the cluster translation engine. A "model," as used herein, refers to a construct that is trained using training data to make predictions or provide probabilities for new data items, whether or not the new data items were included in the training data. For example, training data can include items with various features and an assigned classification. A new data item can have features that a model can use to assign a classification to the new data item. A translation model, for example, can providing mappings between phrases such that, given phrase x in a first language, the translation model can compute a probability that the correct translation of phrase x in a second language is phrase y. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, and others. Models can be configured for various situations, data types, sources, and output formats.

In some implementations, a translation model can be a neural network with multiple input nodes that receive representations of phrases in an input language. The input nodes can correspond to functions that receive the input and produce results. These results can be provided to one or more levels of intermediate nodes ("a hidden layer") that each produce further results based on a combination of lower level node results. A weighting factor can be applied to the output of each node before the result is passed to the next layer node. At a final layer ("an output layer") one or more nodes can produce a value classifying the input. In some implementations, a neural network can be trained with supervised learning, such as for translations, where the training data includes representations of phrases in an input language and a desired output, such as a translation of those phrases in an output language. As training progresses, a representation of the phrases can be provided to the neural network. Output from the neural network can be compared to the desired output for that phrase and, based on the comparison, the neural network can be modified, such as by changing weights between nodes of the neural network or parameters of the functions used at each node in the neural network. After applying each of the phrases in the training data and modifying the neural network in this manner, the neural network model can be trained to evaluate new phrases.

In some implementations, each item of training data can be further paired with a signal user cluster. The signal user clusters can be combined with the phrase inputs for a model of a translation engine. This will cause the training to further encode the layers of the neural network to provide the output based on the user characteristics indicated by the signal user cluster. A cluster translation engine using a model trained in this manner is referred to herein as a "user-signal cluster translation engine." In some implementations, training data can be grouped according similarities between users that produced the input phrases, e.g. each group can be for a set of users with the same values for defined characteristic types. Each group of training data can be used to create a different model customized for use with content created by particular types of users. A cluster machine translation engine using a model trained in this manner is referred to herein as a "user-group cluster translation engine."

In some implementations, the translation system can employ a trained user-signal cluster translation engine in the translation of a new content item by: determining an author of the new content item and identifying characteristics of the author. The translation system can obtain one or more signals representing individual ones or a signal representing a combination of these characteristic values, such as in a matrix or embedding encoding the values or a type indicating a grouping assigned to the author based on multiple of the characteristics. The translation system can also convert language from the new content item into an input format that can be provided to a model, such as vectors representing words or phrases of the new content item. The language from a content item converted into model input in this manner is referred to herein as a "language input conversion" for the content item. In some implementations, the language input conversion can be a single vector representing a combination of the content item word or phrase vectors. In some implementations, this combination can be based on structural (e.g. grammatical) relationships between the words and phrases. The translation system can then provide, as input to the user-signal cluster translation engine, the one or more signals representing user characteristic values and the language input conversion for the content item. Based on the training of the user-signal cluster translation engine, it can then provide one or more most-probable translations of the content item in an output language.

In some implementations, user-group cluster translation engines can be used in the translation of a new content item by: determining an author of the new content item and identifying characteristics of the author. The translation system can then classify the author into one or more defined groups based on these characteristic values and select a component for the user-group cluster translation engine that was trained on data corresponding to the group identified for the content item author. The translation system can also convert language from the new content item into a language input conversion for the content item. The translation system can then provide the language input conversion as input to the user-group cluster translation engine which includes the component for the user-group cluster translation engine that was trained on data corresponding to the group identified for the content item author. Based on the training of this user-group cluster translation engine, it can then provide one or more most-probable translations of the content item in an output language.

Performing machine translations can include sophisticated technical algorithms such as methods for determining and applying phrase correspondences between languages, methods for selecting training data and language corpus data, and methods for formatting data to be provided to models and adjusting models based on the results. Some machine translation engines can produce multiple translations for a single source phrase. In addition, different levels and methods of machine translations can be created and used, such as translators that use different amounts of processing power, use different language corpuses for probability distributions, etc. The disclosed machine translation system can improve machine translations by encoding in the classifier correspondences between identifiable user characters and writing styles that affect translations. For example, a group of users that are from a particular city, in a particular age range, and have a particular education level may have similar writing styles. Training and using machine translation models to be specialized in these writing styles can improve the accuracy or speed of translation systems.

While the technology described herein is primarily described in terms of translations, this technology can equally be applied to other natural language processing engines, such as parts-of-speech tagging, spelling corrections, grammar corrections, parsing, auto-summarization, artificial intelligence, speech recognition, language identification, word segmentation, etc. For example, where a neural network is used as part of a natural language processing engine that identifies a probability that a particular word is misspelled, that neural network can be trained to receive a signal representing a set of characteristics of the author of the word. As another example, where support vector machines ("SVMs") are used as part of a natural language processing engine that classifies the language a content item is written in, a set of SVMs can be trained where each SVM recognizes the source language of content items written by particular types of users. As yet another example, a neural network can be used as part of an acoustic model for speech recognition purpose. User characteristics such as gender or city can be used by the acoustic model to identify a user cluster for a speaker of a speech. The acoustic model defines how likely words or phrases are to appear in the speech, given the identified user cluster. In still yet another example, a neural network can be used as part of a conversational understanding model. User characteristics such as gender or age can be used by the conversational understanding model to identify a user cluster for a speaker participating in a conversation. The conversational understanding model defines how likely words or phrases are to appear in the conversation, given the identified user cluster. User characteristics can also be embedded into, e.g., a sparse matrix, which can be mapped into a lower dimensional embedded value representing a combination of the characteristics.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can build or implement cluster translation engines. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, cluster translation system 164, and other application programs 166. Memory 150 can also include data memory 170 that can include training data associated with authors, author characteristic signals, or groupings; trained translation engine components; configuration data; settings; user options or preferences; etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
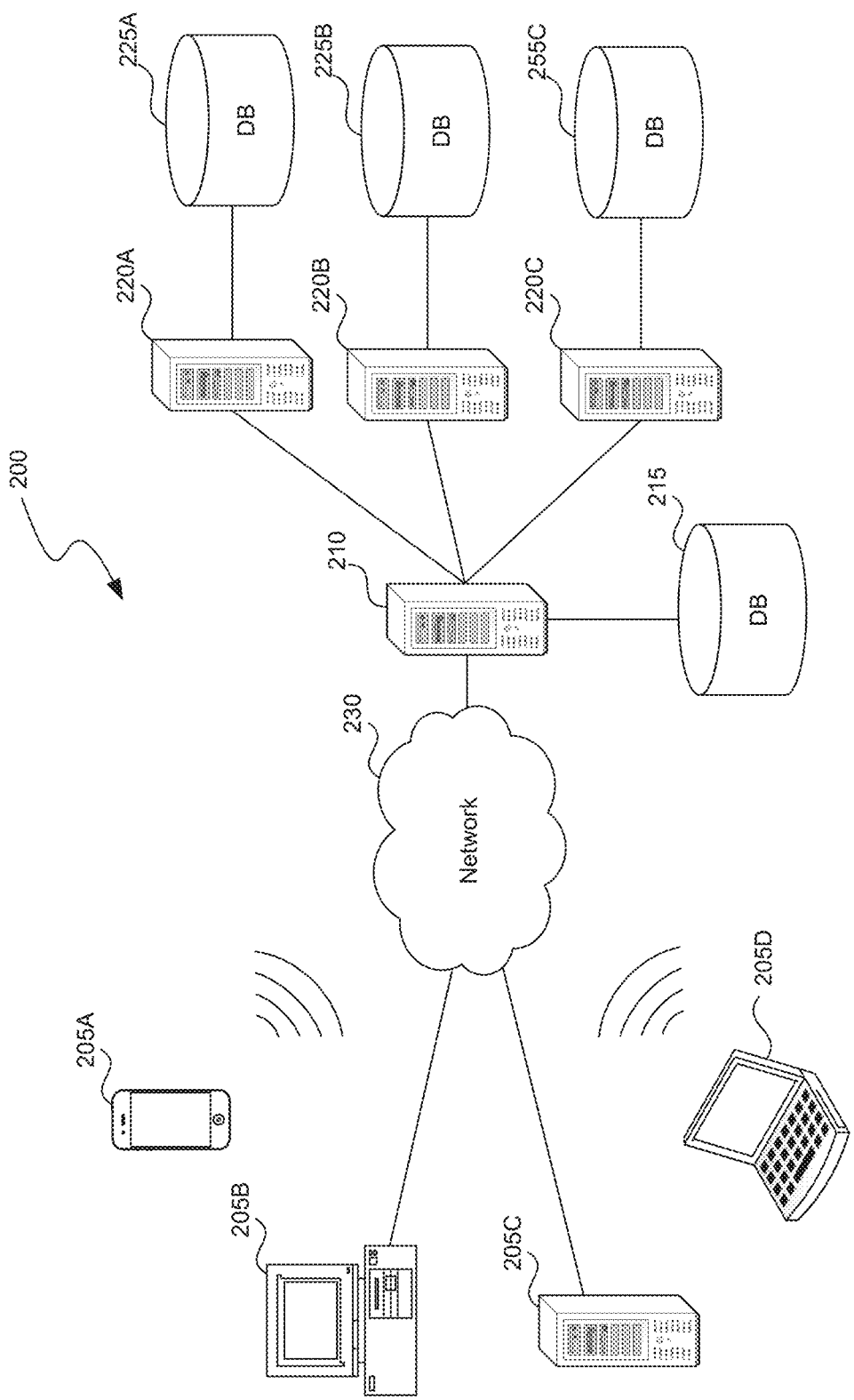
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as training data associated with authors, author characteristic signals, or groupings; trained translation engine components; content items to translate; etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
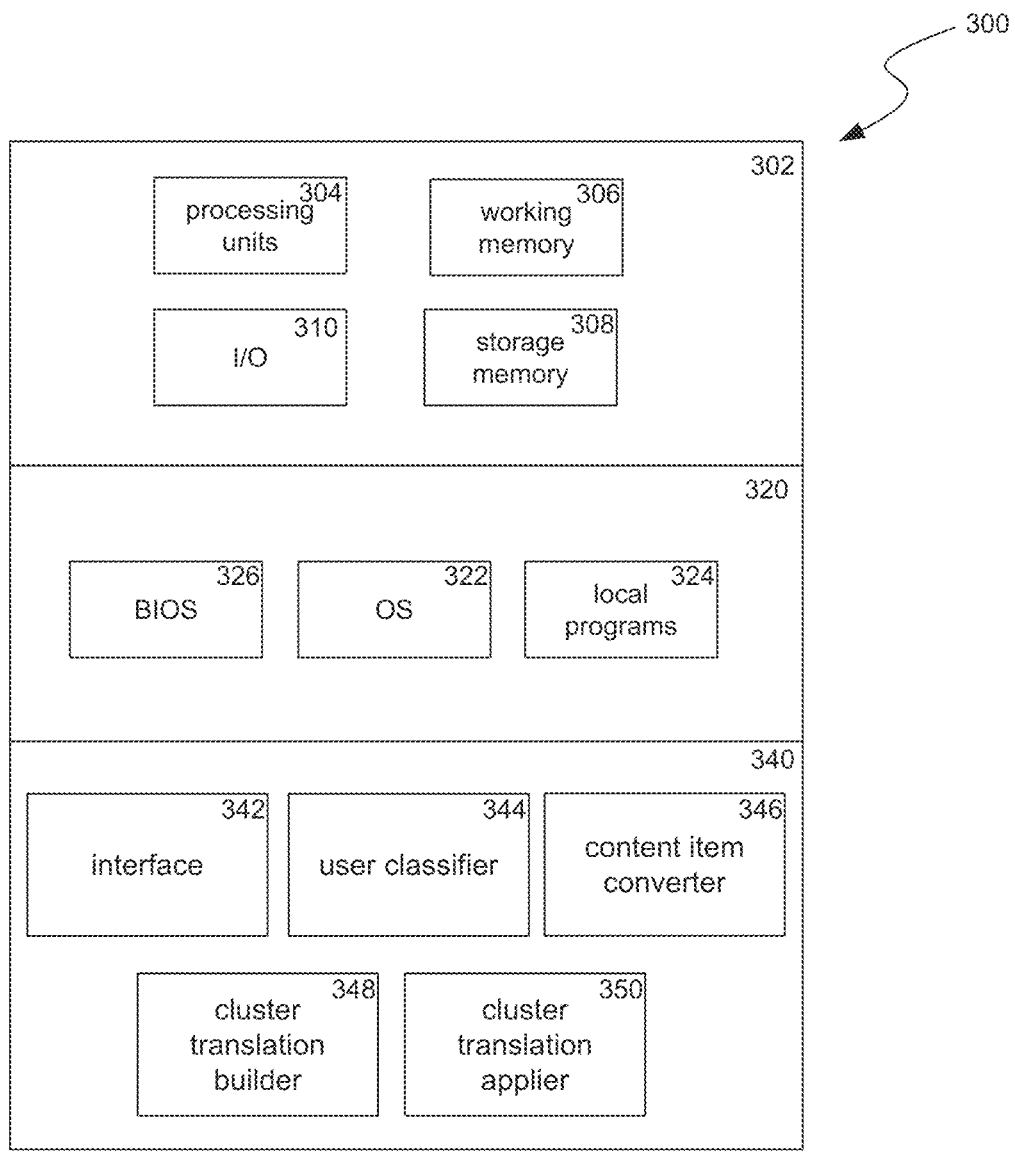
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include: user classifier 344, content item converter 346, cluster translation builder 348, cluster translation applier 350, and components which can be used for transferring data and controlling the specialized components, such as interface 342. In some implementations, components 300 can be in a computing system that is distributed across multiple computing devices or can be an interface to a server-based application executing one or more of specialized components 340.

In some implementations, user classifier 344 can be configured to identify user characteristics for authors of content items, where the content items can either be from a set of training data or can be a content item to be translated with a trained translation model. In various implementations, the characteristics can comprise one or more of: gender, age, date of birth, country, region, city, level of education, life stage, languages identified as ones the user is facile with, occupation, etc. In some implementations, the translation system can be used with a social media system and author characteristics can be obtained by virtue of the user's interactions with the social media system, such as the user's profile, where the user logs in from, locations associated with the user or content posted by the user, friends or friends-of-friends that the user has, a number of friends, types or subjects of content the user consumes, interacts with, or comments on, etc.

In some implementations where the translation system will use the content item with a user-group cluster translation engine, user classifier 344 can obtain a set of values for characteristics corresponding to pre-defined user groupings. In some implementations, a combination of values corresponding to the author of the content item can place that content item in a particular group. For example, where the author characteristics are gender (M or F), education level (1-5 scale), and age (A—0-20; B—21-40; or C—≥=41); there may be 30 groupings, one corresponding to each possible permutation. In this example, content items from a 45 year old female author with an education level of 1 can fall into the 18th grouping: [F; 1; C]. In some implementations, a further value (e.g. U) can be used in one or more of the characteristic categories to indicate a corresponding value for the content item author is not known. For example, where the author characteristics are gender (M; F; or U), education level (1-5 scale or U), and age (A—0-20; B—21-40; C—≥=41; or U); there may be 72 groupings. In this example, content items from a 45 year old female author with an unknown education level can fall into the grouping: [F; U; C]. In some implementations, there can be many more than three possible characteristic, which in some implementations can result in hundreds, thousands, or tens of thousands of groupings.

In some implementations, there is not a separate author grouping for each possible permutation of user characteristics. In some versions of these implementations, different weights can be assigned to different characteristics to select which grouping a content item corresponds to. For example, when selecting a grouping for a content item where the author partially matches multiple of the characteristics for that grouping, a score can be computed for each partially matching grouping by determining a weighted combination of the matching characteristics.

In some implementations where the translation system will use the content item with a user-signal cluster translation engine, user classifier 344 can generate one or more signals corresponding to identified user characteristics. In some implementations, the signal generated by user classifier 344 can be a vector or matrix. Spots in the vector or matrix can correspond to user characteristic types and the vector or matrix can have values filled corresponding to the identified user characteristics for the author of the content item. In some implementations, this can be a sparse vector or matrix. In some implementations, the sparse vector or matrix can be embedded into a lower dimension. In some implementations, the signal can be another combination of the values for the identified author characteristics.

In some implementations, content item converter 346 can be configured to receive a content item, such as through interface 342, and generate a language input conversion for that content item. In some implementations, the language input conversion can be representations, such as vectors, for individual words or phrases from the language of the content item. In some implementations, the generated language input conversion can be a vector representation of the language in the content item, such as a combination of vectors representing individual words or phrases from the language of the content item. In some implementations, the vectors representing individual words or phrases from the language of the content item can be combined in a manner based on a structure of the language of the content item. In some implementations, the language input conversion can be another representation of the language of the content item that can be provided to a translation engine, such as a matrix with a slot for each word in a language and a value indicating a count for how often that word appears in the content item. Additional details regarding creating a representation of the language from a content item are described in U.S. patent application Ser. No. 14/878,762, entitled Deep Translations, and U.S. patent application Ser. No. 14/878,794, entitled Language Independent Representations, each of which is herein incorporated by reference.

In some implementations, cluster translation builder 348 can be configured to train a user-signal cluster translation engine or one or more user-group cluster translation engines. Cluster translation builder can train either of these models using a set of training data, received e.g. through interface 342. This training data can include content items with language content written in a source language paired with at least one translation of that source language content written in an output language. These training data items can also be associated with an author of the source language or identified characteristics of that author.

Cluster translation builder 348 can train a model portion of a user-signal cluster translation engine by applying each item in the training data to the model and adjusting the model based on the results. Cluster translation builder 348 can accomplish this for each training item by: using content item converter 346 to obtain a representation of the source language for the training item; using user classifier 344 to obtain a signal encoding characteristics of the author of that content item; and applying both to the model of an untrained or semi-trained user-signal cluster translation engine. In some implementations, a trained portion of the user-signal cluster translation engine is a neural network and the signal corresponding to each training item generated by user classifier 344 can be provided to the functions corresponding to nodes at a level other than the input level, such as the nodes at one of the hidden layers of the neural network. The results from the user-signal cluster translation engine can be compared to the translation in that training item to adjust parameters of model functions or weights between nodes of the model.

Cluster translation builder 348 can train a model portion of a user-group cluster translation engine by employing user classifier 344 to divide the content items into groups based on the author or author characteristics associated with each training item. Cluster translation builder 348 can then use each group to train a model of the user-group cluster translation engine customized for that group. In some implementations, a minimum number of training items or training items with a minimum amount of the words in a language must be in a group before it can be used to train a model of the user-group cluster translation engine. Where the models are neural networks, cluster translation builder 348 can train each model by, for each training item in a grouping for that model, using content item converter 346 to obtain a representation of the source language for the training item and applying it to an untrained or semi-trained model. The model can operate on the representation of the language of a content item by providing the representation to the functions corresponding to nodes at an input level, with weighted results which can propagate up any hidden levels until a result is produced at an output level. The results from the model can be compared to the translation in that training item to adjust parameters of model functions or weights between nodes of the model, thereby training it.

In some implementations, cluster translation applier 350 can be configured to receive a new content item, e.g. through interface 342, and obtain a translation of it by applying at least one of a user-signal cluster translation engine or a user-group cluster translation engine. The resulting translation can be returned, e.g. through interface 342. Cluster translation applier 350 can obtain, from content item converter 346, a representation of the new content item that can be provided as input to a model. Where cluster translation applier 350 applies a user-signal cluster translation engine, cluster translation applier 350 can provide the received content item or an indication of the author of the received content item to user classifier 344 which can return a user cluster signal, as discussed above. Cluster translation applier 350 can provide the representation of the new content item to the user-signal cluster translation engine, e.g. though input nodes of a neural network. Cluster translation applier 350 can also provide the user cluster signal to the user-signal cluster translation engine, either through the input nodes or through functions at one or more of the functions at hidden layer nodes. Cluster translation applier 350 can then receive and return results from the user-signal cluster translation engine based on the representation of the new content item and the user cluster signal.

Where cluster translation applier 350 applies a user-group cluster translation engine, cluster translation applier 350 can provide an indication of the author of the received content item to user classifier 344 which can return an identification of a group user cluster for this user, as discussed above. Cluster translation applier 350 can then select a model corresponding to the identified group user cluster, from multiple models trained for various ones of possible group user clusters. Cluster translation applier 350 can provide the representation of the new content item to the selected model of the user-group cluster translation engine, e.g. though input nodes of a neural network. Cluster translation applier 350 can then receive and return results from the user-group cluster translation engine, using the selected model, based on the representation of the new content item.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
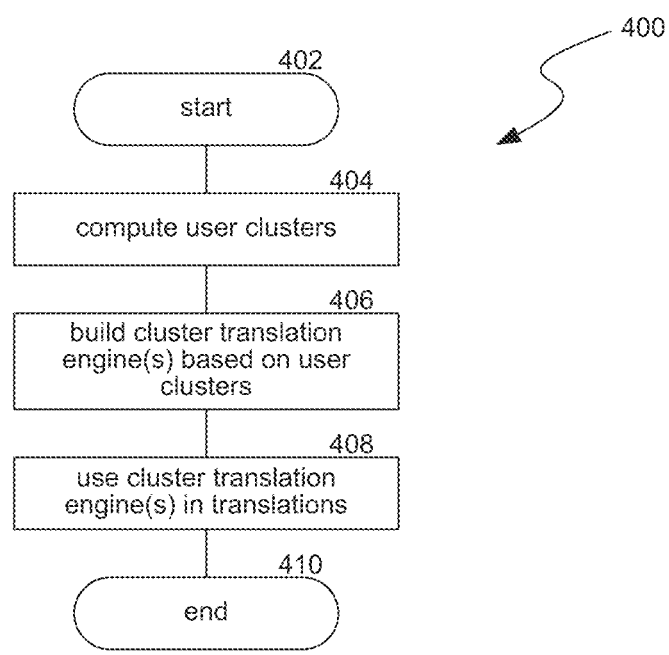
FIG. 4 is a flow diagram illustrating a process used in some implementations for building and using cluster translation engines.

FIG. 4 is a flow diagram illustrating a process 400 used in some implementations for building and using cluster translation engines. Process 400 begins at block 402 and continues to block 404. At block 404, process 400 can receive a set of training items. Each training item can include a content item source in a source language, a translation of the source in an output language, and can be associated with an author of the source content item or characteristics of the author of the source content item. Process 400 can compute a user cluster for each training item based on identified user characteristics of the author corresponding to that training item.

In various implementations, the user characteristics can comprise one or more of: gender, age, date of birth, location (e.g. longitude/latitude, country, region, city, etc.), level of education, life stage, relationship status, first name, a model of devices typically used, languages identified as ones the author is facile with, occupation, a number of friends, which friends the author has, which friends-of-friends the author has, a number of friend requests the author has received, a number of subscribers to content produced by the author, a time the author created the content item, times the author typically accesses a social media website, whether the content item was from a phone or a computer, whether the author typically accesses a social media website from phone or a computer, level of activity on a social media website, etc. As discussed above, depending on whether the cluster translation engine is a user-signal cluster translation engine or a user-group cluster translation engine, process 400 can use the identified author user characteristics to identify a group user cluster or generate a signal user cluster for each training item. Identifying a group user cluster can comprise selecting a group corresponding to the characteristics identified for the author of the content item. For example, for a content item where all that is known about the author is that the author has a graduate degree, lives in Australia, and is 25 years old, and groups are based on the characteristics: education level, gender, country, age, and first name, that content item can be placed in a group corresponding to [>=gradDegree; unknown; AU; 20-25; unknown].

Identifying a signal user cluster can comprise determining a signal corresponding to a combination of the author user characteristics for a content item, such as by entering the user characteristics in a sparse vector or matrix. In some implementations, the sparse vector or matrix can be converted into an embedding, e.g. a lower dimension vector or matrix, a value on a continuum, etc. For example, for a content item where all that is known about the author is that the author is female, lives in San Francisco, and is named Alice, and the slot designations for of user characteristics that can be entered in a sparse vector are: [gender(M/F or null), city(50 possible cities or null), age(5 age ranges or null), first name group(20 name groupings or null)] the sparse vector for that content item can be: [F, city23, null, nameGroup5], which could be embedded to a single value of 7,629 (of the 19,278 possible signals).

At block 406, process 400 can use the received training data to build one or more cluster translation engines, either as user-group cluster translation engines or user-signal cluster translation engines, based on the user clusters assigned to each training item. In some implementations, process 400 can build a user-group cluster translation engine for each group of training items corresponding to each distinct group user cluster, as identified at block 404. Each subset of the training items can be applied to a different untrained or semi-trained user-group cluster translation engine by computing language input conversions for the source in the training items in that subset and providing the language input conversions to the corresponding user-group cluster translation engine. Model parameters or weights can then be adjusted based on a comparison of the output of that user-group cluster translation engine and a corresponding translation from that training item, thereby further training that user-group cluster translation engine. Additional details regarding building each user-group cluster translation engine are provided below in relation to FIG. 5A.

In some implementations, process 400 can build a user-signal cluster translation engine using the set of training items and the signal user clusters, as identified at block 404. Each of the training items can be applied to an untrained or semi-trained user-signal cluster translation engine by computing language input conversions for the source in that training item and providing the language input conversions along with the signal user cluster identified for that training item to the user-signal cluster translation engine. The model parameters or weights can then be adjusted based on a comparison of the output of the user-signal cluster translation engine and a corresponding translation from that training item, thereby further training the user-signal cluster translation engine. Additional details regarding building a user-signal cluster translation engine are provided below in relation to FIG. 5B.

At block 408, process 400 can apply the cluster translation engine(s) built at block 406 to one or more new content items. In some implementations, the cluster translation engines can be user-group cluster translation engines and applying them can comprise: identifying a group user cluster for an author corresponding to the new content item, selecting one of the user-group cluster translation engines corresponding to the identified group user cluster, generating a language input conversion for the new content item, and applying the selected user-group cluster translation engine to the language input conversion. Additional details regarding using a user-group cluster translation engine are provided below in relation to FIG. 6A. In some implementations, the cluster translation engine can be a user-signal cluster translation engine and applying it can comprise: identifying a signal user cluster for an author corresponding to the new content item, generating a language input conversion for the new content item, and applying the user-signal cluster translation engine to the language input conversion and the signal user cluster. Additional details regarding using a user-signal cluster translation engine are provided below in relation to FIG. 6B. Process 400 then continues to block 410, where it ends.

Figure 5A:
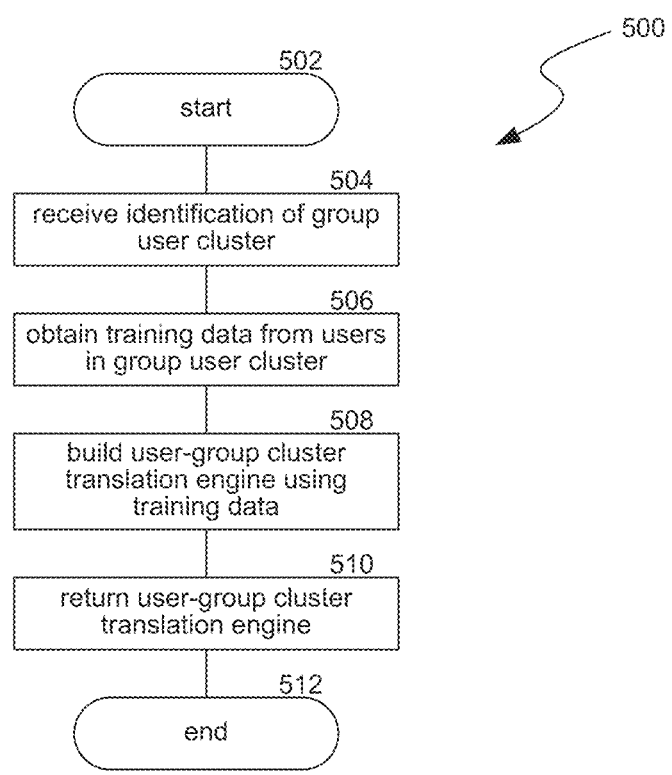
FIG. 5A is a flow diagram illustrating a process used in some implementations for building cluster translation engines based on user groupings.

FIG. 5A is a flow diagram illustrating a process 500 used in some implementations for building cluster translation engines based on a user grouping. Process 500 begins at block 502 and continues to block 504. At block 504, process 500 can receive an identification of a group user cluster to build a user-group cluster translation engine for. For example, the identification of a group user cluster can be a set of user characteristic values corresponding to one or more identifiable characteristics of users of a social media website.

At block 506, process 500 can obtain training data comprising a set of training items that were authored by users corresponding to the group user cluster identified at block 504. The training items can each comprise a source item in a source language, as identification of an author of that source, and a translation of that source in an output language. For example, this can be content items from a social media website that have available translations and that were authored by a user of the social media website with characteristic values matching all of the characteristics for the group user cluster identified at block 504. In some implementations, if not enough training items can be located that were authored by users matching all of the characteristics for the group user cluster identified at block 504, search parameters for training items can be broadened, such as by removing characteristics identified as being of lower weight or by expanding ranges for identified characteristics (e.g. if a characteristic is an age range of 25-30, it can be expanded to 24-31). The source in each training item can be converted into a language input conversion, such as vectors representing words or phrases of the source of that training item.

At block 508, process 500 can build, for the user group cluster identified at block 504, a user-group cluster translation engine by training it with the training data obtained at block 506. Where the user-group cluster translation engine includes a neural network, process 500 can train it by providing the language input conversions for each training item to the input nodes of the neural network. Results from the input nodes propagate up through any hidden layers to an output layer of the neural network to produce results. In some implementations, the translation engine can include a translation model that generates one or more possible translations of a source content item and can include a language model that selects one or more most-probable translations based on a probability distribution showing a likelihood of phrases occurring in the output language. In some implementations, the translation engine can have a model such as a neural network that embodies the combined functions of a translation model and a language model, e.g. a model that provides a most a probable translation given a source content item. The translation output, from the user-group cluster translation engine, for each training item can be compared to the corresponding translation in that training item to determine a difference value. For example, the translation in the training item and the translation produced by the user-group cluster translation engine can be represented as vectors and the cosine difference between the vectors can be computed. Based on this difference value, weights between nodes or parameters of node functions can be adjusted so that the output of the user-group cluster translation engine more closely matches the translation from that training item. After applying all the training items obtained at block 506, the user-group cluster translation engine can be trained to provide translations of new content items created by users corresponding to the group user cluster identified at block 504. At block 510, process 500 can return the trained user-group cluster translation engine. Process 500 can then continue to block 512, where it ends.

Figure 5B:
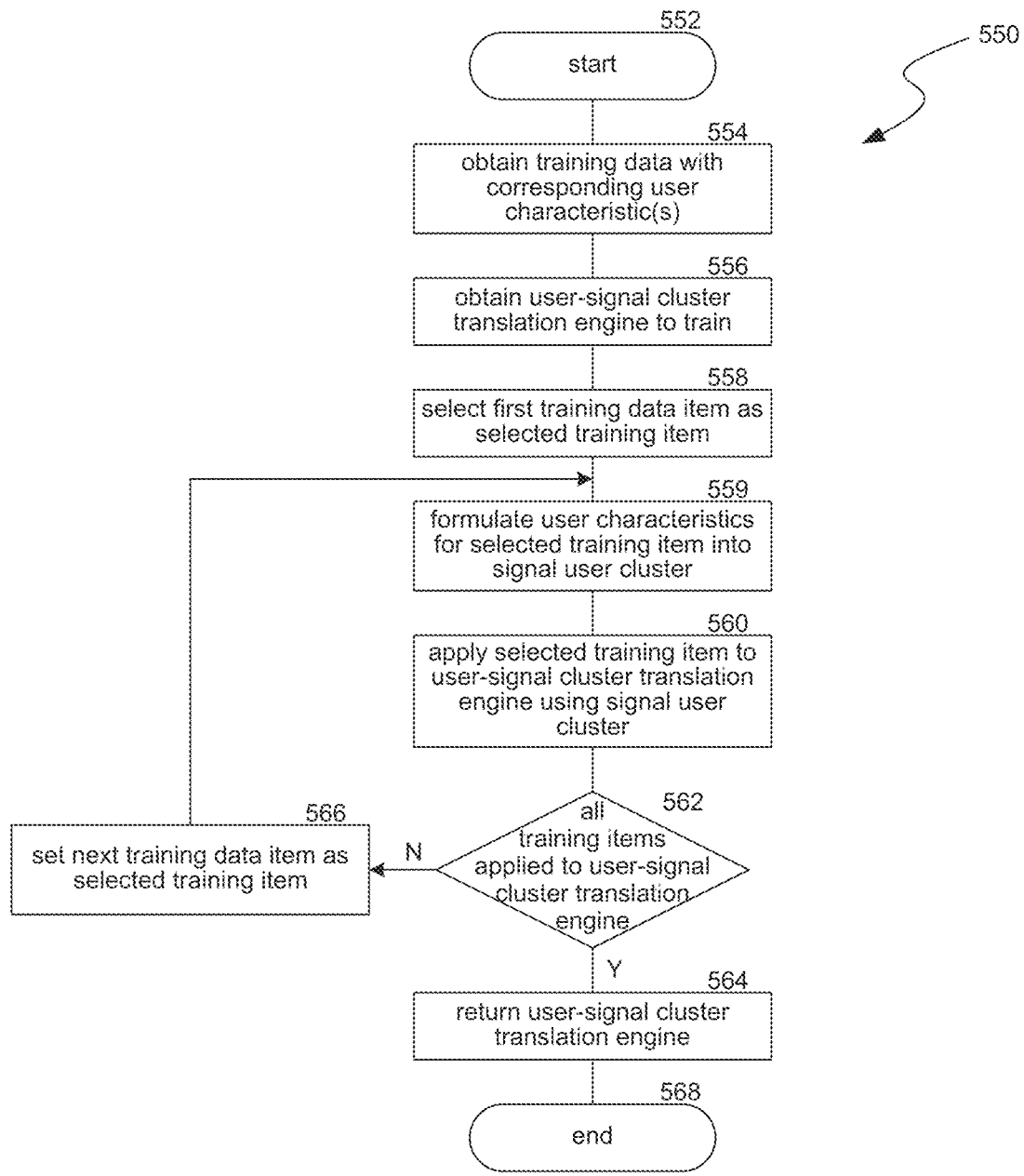
FIG. 5B is a flow diagram illustrating a process used in some implementations for building cluster translation engines based on user characteristic input signals.

FIG. 5B is a flow diagram illustrating a process 550 used in some implementations for building cluster translation engines based on user characteristic input signals. Process 550 begins at block 552 and continues to block 554. At block 554, process 550 can obtain training data including training items. The training items can each comprise a source item in a source language associated with an author of that source and a translation of that source in an output language. For example, this can be content items from a social media website that have available translations and that were authored by a user of the social media website. The source in each training item can be converted into a language input conversion, such as a set of vectors representing words or phrases of the source of that training item.

At block 556, process 550 can obtain a user-signal cluster translation engine to train, which can include a translation model that generates one or more possible translations of a source content item and can include a language model that selects one or more most-probable translations based on a probability distribution showing likelihoods of phrases occurring in the output language. In some implementations, the translation engine can have a model such as a neural network that embodies the combined functions of a translation model and a language model, e.g. a model that provides a most-probable translation given a source content item. The user-signal cluster translation engine obtained at block 556 can be untrained or only partially trained to correctly identify a translation of a content item.

At block 558, process 550 can select a first one of the training items as a selected training item to be operated on by the loop between blocks 559-566. At block 559, process 550 can obtain user characteristics associated with the author of the selected training item and formulate them into a signal user cluster. As discussed above, a signal user cluster can be a combination of user characteristics, such as where values representing the characteristics are entered in a matrix or vector, e.g. a sparse matrix. In some implementations, this matrix can be embedded, such as by determining a value on a continuum corresponding to the matrix.

At block 560, process 550 can provide the language input conversion for the selected training item and the signal user cluster formulated at block 559 to the user-signal cluster translation engine obtained at block 556. Process 550 can provide the language input conversion to the user-signal cluster translation engine by applying each function corresponding to one of the input nodes to the language input conversion. In some implementations, these functions can also take the signal user cluster. In some implementations, the functions corresponding to the input layer nodes only take the language input conversion and functions at one or more of the hidden layers can take both the results from lower layer node functions and the signal user cluster. Based on the language input conversion and the signal user cluster, the user-signal cluster translation engine can produce a translation for the source of the selected training item. A difference between the produced translation and the translation from the selected training item can be computed. For example, the translation in the training item and the translation produced by the user-signal cluster translation engine can be represented as vectors and the co-sign difference between the vectors can be computed. Based on the computed difference, function parameters or weights between nodes can be adjusted such that the difference is smaller.

At block 562, process 550 can determine whether all the training items obtained at block 554 have been operated on by the loop between blocks 559-566. If so, process 550 continues to block 564. If not, process 550 continues to block 566. At block 566, process 550 can set the next training item, of the training items obtained at block 554, as the selected training item to be operated on by the loop between blocks 559-566. Once this loop has operated on all the training items, process 550 continues to block 564, where it returns the trained user-signal cluster translation engine. Process 568 can then continue to block 568, where it ends.

Figure 6A:
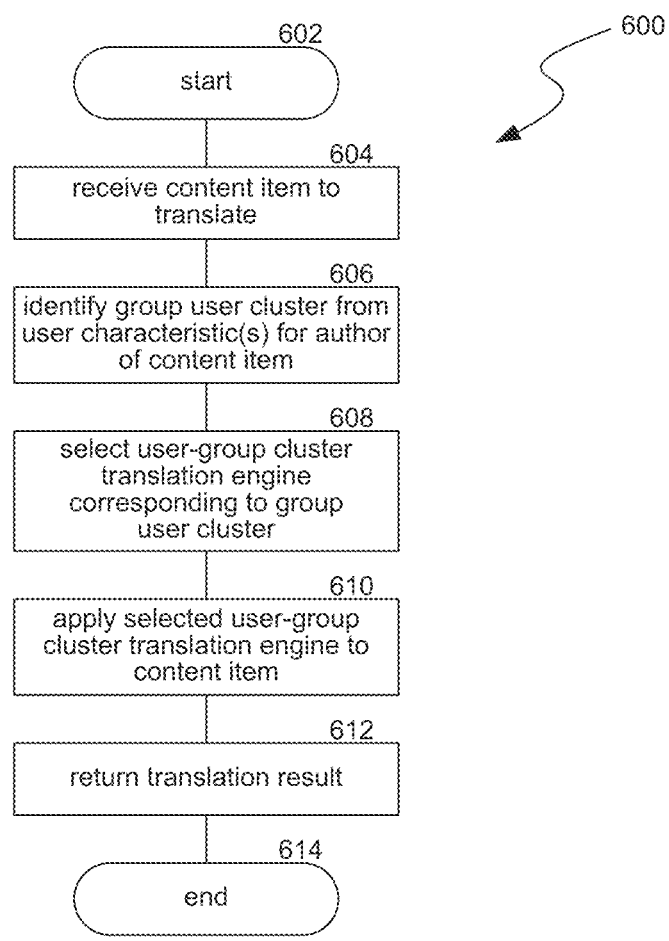
FIG. 6A is a flow diagram illustrating a process used in some implementations for using cluster translation engines based on user groupings.

FIG. 6A is a flow diagram illustrating a process 600 used in some implementations for using a cluster translation engine based on user groupings. Process 600 begins at block 602 and continues to block 604. At block 604, process 600 can receive a content item to translate. The content item can be in a format that can be provided as input to a model or process 600 can compute a language input conversion for the content item. The content item can be associated with an author, and at block 606, process 600 can identify one or more characteristics of the author that were used for creating one or more user-group cluster translation engines. From these characteristics, process 600 can identify a group user cluster corresponding to the content item author.

At block 608, process 600 can select a user-group cluster translation engine corresponding to the group user cluster identified at block 606. In some implementations, the selected user-group cluster translation engine can have been created by process 500 using training data where the source portion of each training item was associated with an author classified in the same group user cluster as the group user cluster identified at block 606. At block 610, process 600 can apply the user-group cluster translation engine selected at block 608 to the language input conversion obtained or computed at block 604. Where the user-group cluster translation engine includes a neural network, applying it to the language input conversion can include having the function corresponding to each of the neural network input nodes operate on the language input conversion. The results of these functions can propagate through any hidden layers to functions at an output layer, which can produce results. Process 600 can then produce a translation of the content item based on these results from the neural network. At block 612, process 600 can return the translation of the content item. Process 600 can then continue to block 614, where it ends.

Figure 6B:
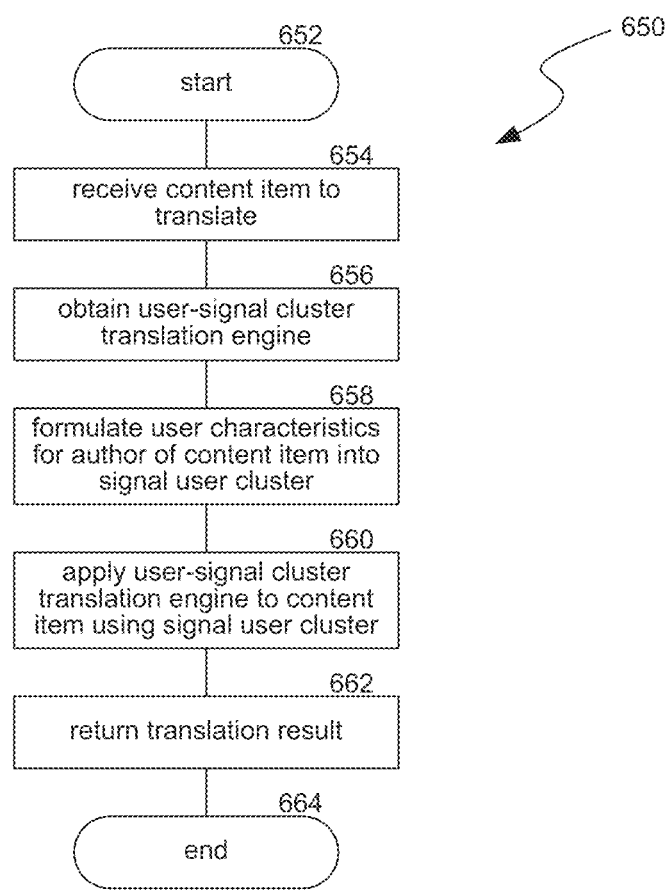
FIG. 6B is a flow diagram illustrating a process used in some implementations for applying cluster translation engines based on user characteristic input signals.

FIG. 6B is a flow diagram illustrating a process 650 used in some implementations for applying cluster translation engines based on user characteristic input signals. Process 650 begins at block 652 and continues to block 654. At block 654, process 650 can receive a content item to translate. The content item can be in a format that can be provided as input to a model or process 650 can compute a language input conversion for the content item.

At block 656, process 650 can obtain a user-signal cluster translation engine. In some implementations, the obtained user-signal cluster translation engine can have been created by process 550 where, when training the user-signal cluster translation engine, the user-signal cluster translation received as input each training item and a corresponding signal user cluster indicating characteristics of the author of the source of that training item.

The content item received at block 654 can be associated with an author, and at block 658, process 650 can identify one or more characteristics of the author. From these characteristics, process 650 can compute a signal user cluster, e.g. as a sparse matrix, an embedding, or other value encoding of one or more characteristics or combination of characteristics.

At block 660, process 650 can apply the user-signal cluster translation engine obtained at block 656 to A) the language input conversion obtained at block 654 and B) the signal user cluster computed at block 658. Where the user-signal cluster translation engine includes a neural network, applying it to the language input conversion and signal user cluster can include having the function corresponding to each of the neural network input nodes operate on the language input conversion. In some implementations, these input nodes can also take as parameters the signal user cluster computed at block 658. The results of these functions can propagate through any hidden layers to functions at an output layer, which can produce results. In some implementations, functions at hidden layer nodes can take the signal user cluster as a parameters instead of, or in addition to, the input layer nodes taking the signal user cluster as a parameter. Process 650 can then produce a translation of the content item based on the neural network results. At block 662, process 650 can return the translation of the content item. Process 650 can then continue to block 654, where it ends.

Figure 7A:
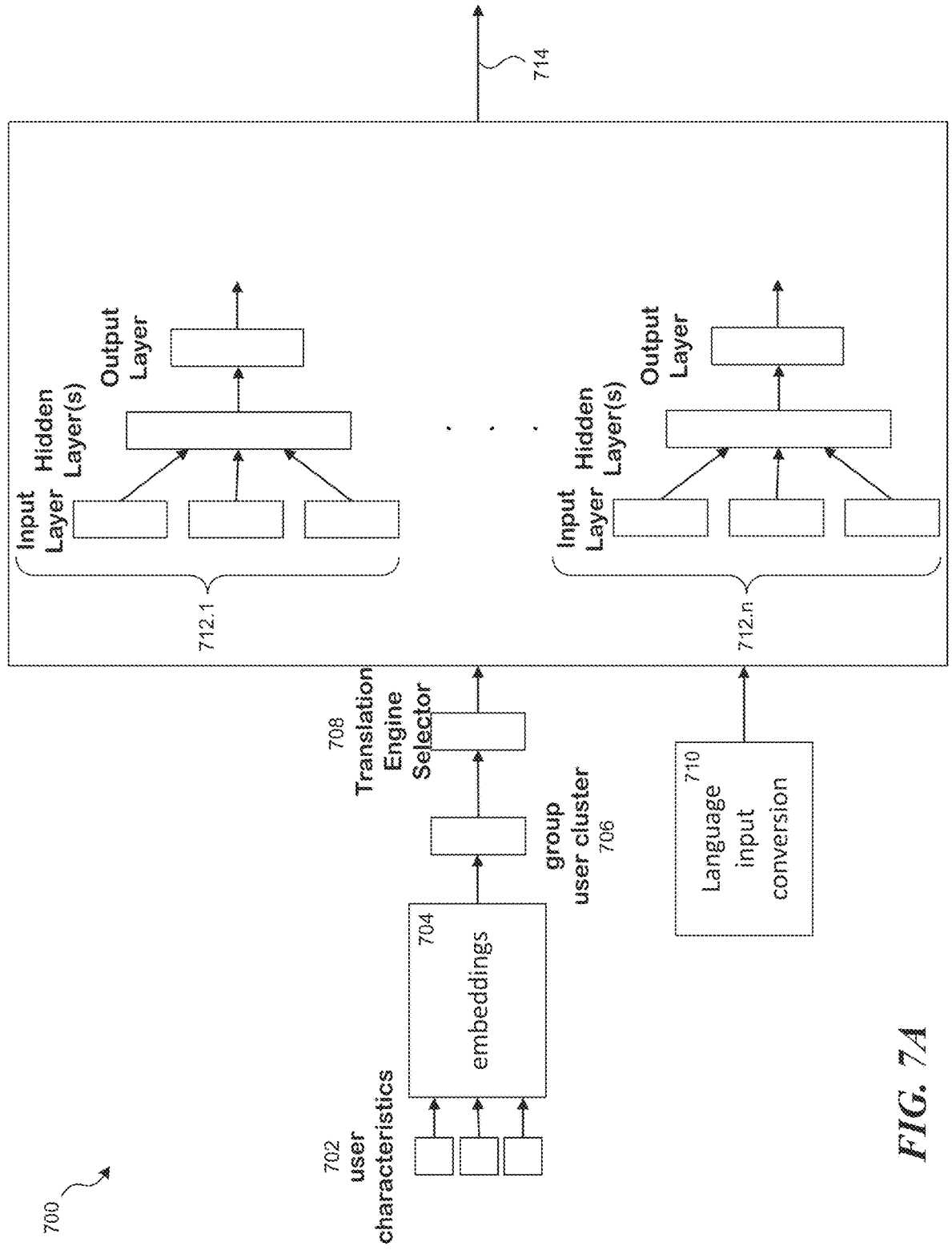
FIG. 7A is an example illustrating selecting cluster translation engines based on user groupings.

FIG. 7A is an example 700 illustrating selecting cluster translation engines based on user groupings. In example 700, user characteristics 702 and a language input conversion 710 are received. The user characteristics 702 are received by embedding component 704, which produces group user cluster 706. Based on the group user cluster 706, translation engine selector 708 selects a corresponding trained neural network from one of neural networks 712.1-712.n. The language input conversion 710 is provided to the selected neural network, which produces output 714.

Figure 7B:
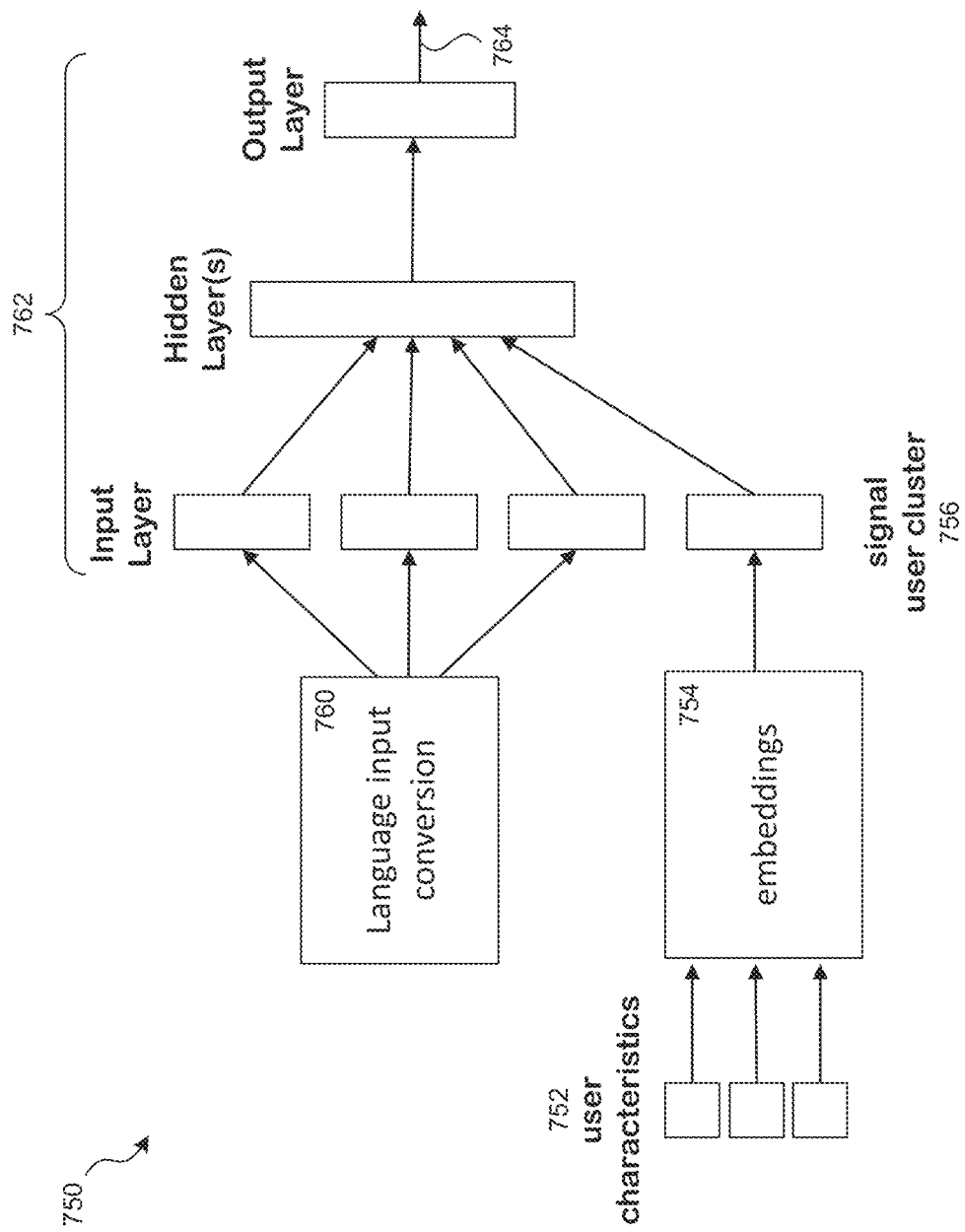
FIG. 7B is an example illustrating cluster translation engines that receive user characteristic signals as input.

FIG. 7B is an example 750 illustrating cluster translation engines that receive user characteristic signals as input. In example 750, user characteristics 752 and a language input conversion 760 are received. The user characteristics 752 are received by embedding component 754, which produces signal user cluster 756. The language input conversion 760 is provided to the input layer of neural network 762, which produces input layer results that are passed to one or more hidden layers. One of the hidden layers also receives signal user cluster 756. Results propagate through the hidden layers to the output layer, which produces output 764.

In particular embodiments, training elements and other data, e.g. data from an online social network, may be associated with privacy settings. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, a social-networking system may send a request to the data store for the object. The request may identify the user associated with the request and may only be sent to the user if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. Although this disclosure describes enforcing privacy settings in a particular manner, this disclosure contemplates enforcing privacy settings in any suitable manner.

Some embodiments described herein make use of data or metrics that may include information voluntarily provided by one or more users. In such embodiments, data privacy may be protected in a number of ways.

For example, the user may be required to, or may voluntarily, opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computer implemented method of using a user-signal cluster translation engine, comprising:

receiving a content item comprising a source and is associated with a source author;

obtaining a user-signal cluster translation engine comprising a neural network, the user-signal translation engine having been trained using a plurality of training items and a training signal user cluster;

generating a signal user cluster by entering two or more the multiple characteristics into a sparse matrix or vector;

obtaining, via the user-signal cluster translation engine, a translation result of the source associated with the content item, wherein the user-signal cluster translation engine is modified based on computing a cosine difference value between vector representations of the translation result and a translation of the source; and returning the translation result.

2. The method of claim 1, wherein the source comprises acoustic speech data, and wherein the author is a speaker.

3. The method of claim 1, wherein the signal user cluster is further formulated by embedding the sparse matrix or vector into a value with a lower dimension than the sparse matrix or vector.

4. The method of claim 1, wherein the obtaining of the translation result comprises:

converting the source into a language input conversion by:

combining vectors corresponding to words or phrases of the source; and combining the vectors corresponding to words or phrases of the source into a single vector representation of the source; and providing the language input conversion as input to a model of the user-signal cluster translation engine.

5. The method of claim 1, wherein the obtaining of the translation result comprises:

providing, to each function corresponding to input layer nodes of the neural network, the signal user cluster and the source representation included in the content item; and providing, to functions corresponding to nodes at one or more hidden layers of the neural network, the signal user cluster.

6. The method of claim 1, wherein the multiple characteristics comprise two or more of gender, age, country, region, city, level of education, life stage, or any combination thereof.

7. The method of claim 1, wherein applying the user-signal cluster translation engine to the source representation included in the content item and the signal user cluster comprises using a translation model to determine a proposed translation of the source from multiple possible translations of the source based on a probability distribution showing how likely the possible translations are to appear in an output language.

8. A non-transitory computer-readable storage medium storing instructions that, when executed by a computing system, cause the computing system to perform operations for using a user-group cluster translation engine, the operations comprising:

receiving a content item comprising a source and is associated with a source author;

obtaining a user-signal cluster translation engine comprising a neural network, the user-signal translation engine having been trained using a plurality of training items and a training signal user cluster;

generating a signal user cluster by entering two or more multiple characteristics into a sparse matrix or vector;

obtaining, via the user-signal cluster translation engine, a translation result of the source associated with the content item, wherein the user-signal cluster translation engine is modified based on computing a cosine difference value between vector representations of the translation result and a translation of the source; and returning the translation result.

9. The non-transitory computer-readable storage medium of claim 8, wherein the source comprises acoustic speech data, and wherein the source author is a speaker.

10. The non-transitory computer-readable storage medium of claim 8, wherein computing a language input conversion for the content item comprises:

combining vectors corresponding to words or phrases of the source; and combining the vectors corresponding to words or phrases of the source into a single vector representation of the source.

11. The non-transitory computer-readable storage medium of claim 8, wherein the obtaining of the translation result comprises providing the language input conversion as input to a model of the user-group cluster translation engine.

12. The non-transitory computer-readable storage medium of claim 8, wherein the two or more user characteristics comprise one or more of gender, age, country, region, city, level of education, life stage, or any combination thereof.

13. The non-transitory computer-readable storage medium of claim 8, wherein the obtaining of the translation result comprises using a translation model to determine a proposed translation of the source from multiple possible translations of the source based on a probability distribution showing how likely the possible translations of words or phrases are to appear in an output language.

14. A system for applying a user-signal cluster translation engine, comprising:

memory;

one or more processors operable to execute stored instructions that, when executed, cause the one or more processors to:

receive a content item comprising a source and is associated with a source author;

obtain a user-signal cluster translation engine comprising a neural network, the user-signal translation engine having been trained using a plurality of training items and a training signal user cluster;

generate a signal user cluster by entering two or more multiple characteristics into a sparse matrix or vector;

obtain, via the user-signal cluster translation engine, a translation result of the source associated with the content item, wherein the user-signal cluster translation engine is modified based on computing a cosine difference value between vector representations of the translation result and a translation of the source; and return the translation result.

15. The system of claim 14, wherein the one or more processors is further caused to compute the signal user cluster by embedding the sparse matrix or vector into a value with a lower dimension than the sparse matrix or vector.

16. The system of claim 14, wherein the one or more processors is further caused to obtain the translation result by providing the language input conversion and the signal user cluster to each function corresponding to input layer nodes of the neural network.

17. The system of claim 14, wherein the one or more processors is further caused to convert the language into a language input conversion by combining the vectors corresponding to words or phrases of the language into a single vector representation of the language.

18. The system of claim 14, wherein the language comprises acoustic speech data, and wherein the author is a speaker.

19. The system of claim 14, wherein the two or more user characteristics comprise one or more of gender, age, country, region, city, level of education, life stage, or any combination thereof.

20. The system of claim 14, wherein the one or more processors is further caused to obtain the translation result using a translation model to determine a proposed translation of the language from multiple possible translations of the language based on a probability distribution showing how likely the possible translations are to appear in an output language.

* * * * *